Oct. 15, 1957 — O. T. WILBOURN — 2,809,458
COLOR GUIDE FOR FISHING LURES
Filed April 18, 1955
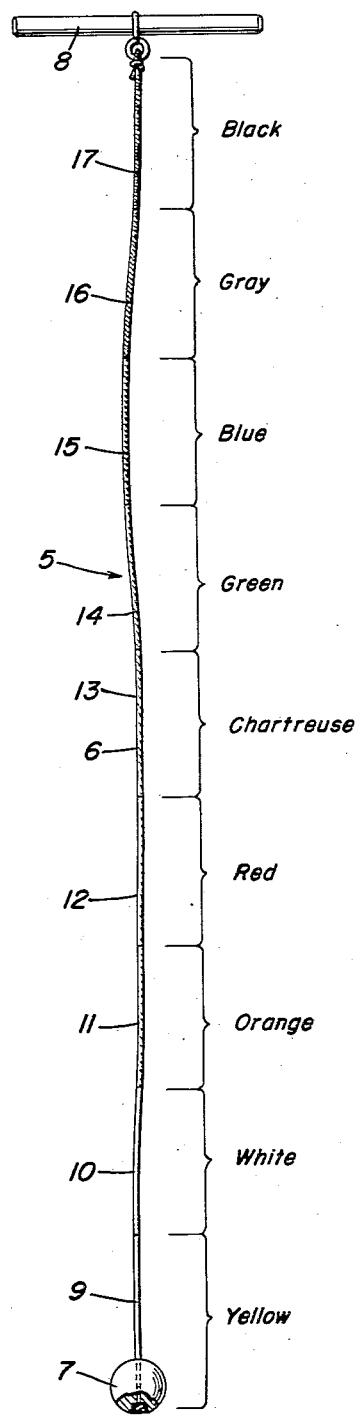
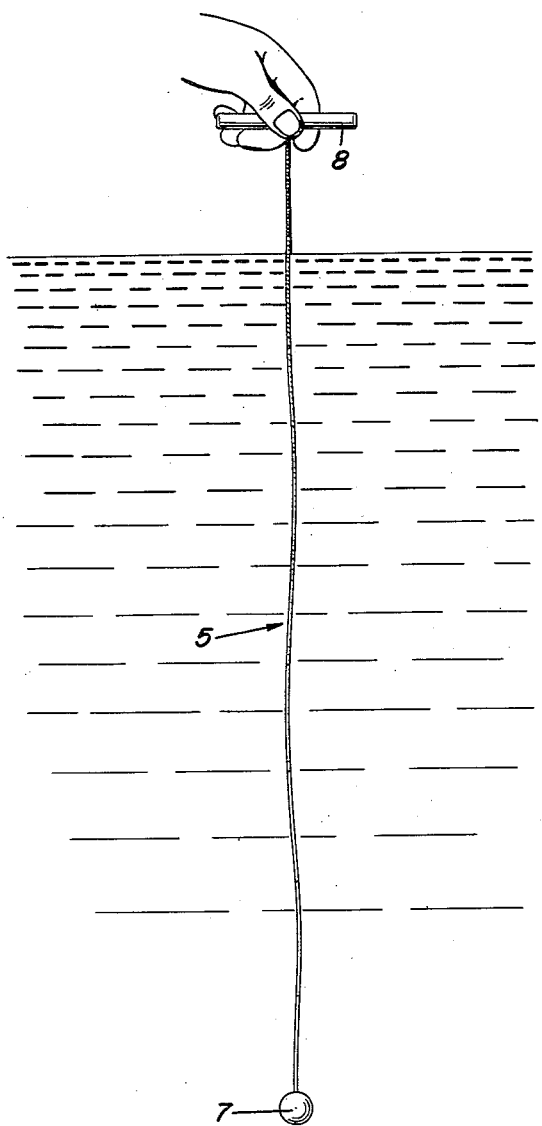
Orion T. Wilbourn
INVENTOR.

United States Patent Office 2,809,458
Patented Oct. 15, 1957

2,809,458

COLOR GUIDE FOR FISHING LURES

Orion T. Wilbourn, Magnolia, Ark.

Application April 18, 1955, Serial No. 502,037

2 Claims. (Cl. 43—1)

The present invention relates to new and useful improvements in color guides for use by fishermen to select the most effectively colored artificial lure according to existing water conditions.

Experienced fishermen know that when atmospheric conditions are bright and the water is clear, a bright colored lure will tend to frighten fish or cause them to become suspicious of the lure. Accordingly, under such conditions, a darker lure or one having a more subdued color should be used. On the other hand, if light conditions are poor and the water cloudy, a brighter colored lure would prove more effective.

Accordingly, it is an object of the present invention to provide a color guide by means of which the fisherman will be aided in the selection of the most effective lure under existing light and water conditions.

Another object is to provide a color guide of simple and practical construction, which is efficient and reliable in use, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the color guide; and

Figure 2 is a side elevational view thereof shown submerged in water.

Referring now to the drawing in detail, wherein for the purpose of illustration, I have disclosed a preferred embodiment of my invention, the numeral 5 designates an elongated, relatively slender member of predetermined length and which may comprise a flexible cord, tape or the like, or which may comprise a rigid stick or rod, and when the flexible cord 6 is employed, a weighted body 7 forming a sinker is attached at one end thereof to submerge the cord in water. A handle 8 is attached to the other end of the cord.

The weighted body 7 as well as a predetermined length of the cord adjacent the body, are colored yellow, as indicated at 9, and which comprises the color of greatest visibility in fishing waters, and corresponding lengths of the cord above the yellow colored section are successively colored white, as indicated at 10, orange at 11, red at 12, chartreuse at 13, green at 14, blue at 15, gray at 16 and the uppermost end of the cord is colored black, as shown at 17. The above colors have been tested and found most effective in the arrangement set forth in their order of intensity of visibility.

In testing the atmospheric and water conditions for fishing, the weighted body 7 is lowered in the water until it disappears from sight. At that point, stop and ascertain the color of the cord that is at the surface of the water and that color will indicate the most effective color of the lure to be selected.

The foregoing is considered as illustrative only of the principles of the invention. Further, since numerous modifications and changes will readily occur to those skilled in the art, it is not desired to limit the invention to the exact construction and operation as described and shown, and accordingly, all suitable modifications and equivalents may be resorted to, falling within the scope of the invention as claimed.

What is claimed as new is as follows:

1. A fish lure color guide for indicating the color of fish lure to be used in fishing waters of different turbidity comprising an elongated member adapted to be lowered in fishing waters and provided with a terminal sinker member thereon for lowering thereby and adapted to disappear from view at different depths according to the degree of turbidity of the water, said elongated member being provided with linear series of sections of different colors corresponding to differently colored fish lures and indicating at the surface of the water at the instant of disappearance of the sinker member the color of fish lure to be used.

2. A fish lure color guide as in claim 1, said series of color sections including a section having the highest degree of visibility in fishing waters adjacent said sinker member.

References Cited in the file of this patent

UNITED STATES PATENTS 1,049,873    Kopke   ---------------- Jan. 7, 1913
1,982,304    Holden   --------------- Nov. 27, 1934